Oct. 20, 1942.         J. STRONG         2,299,415
COMBINED FILTER AND PNEUMATIC PRESSURE TANK
Filed Sept. 5, 1939
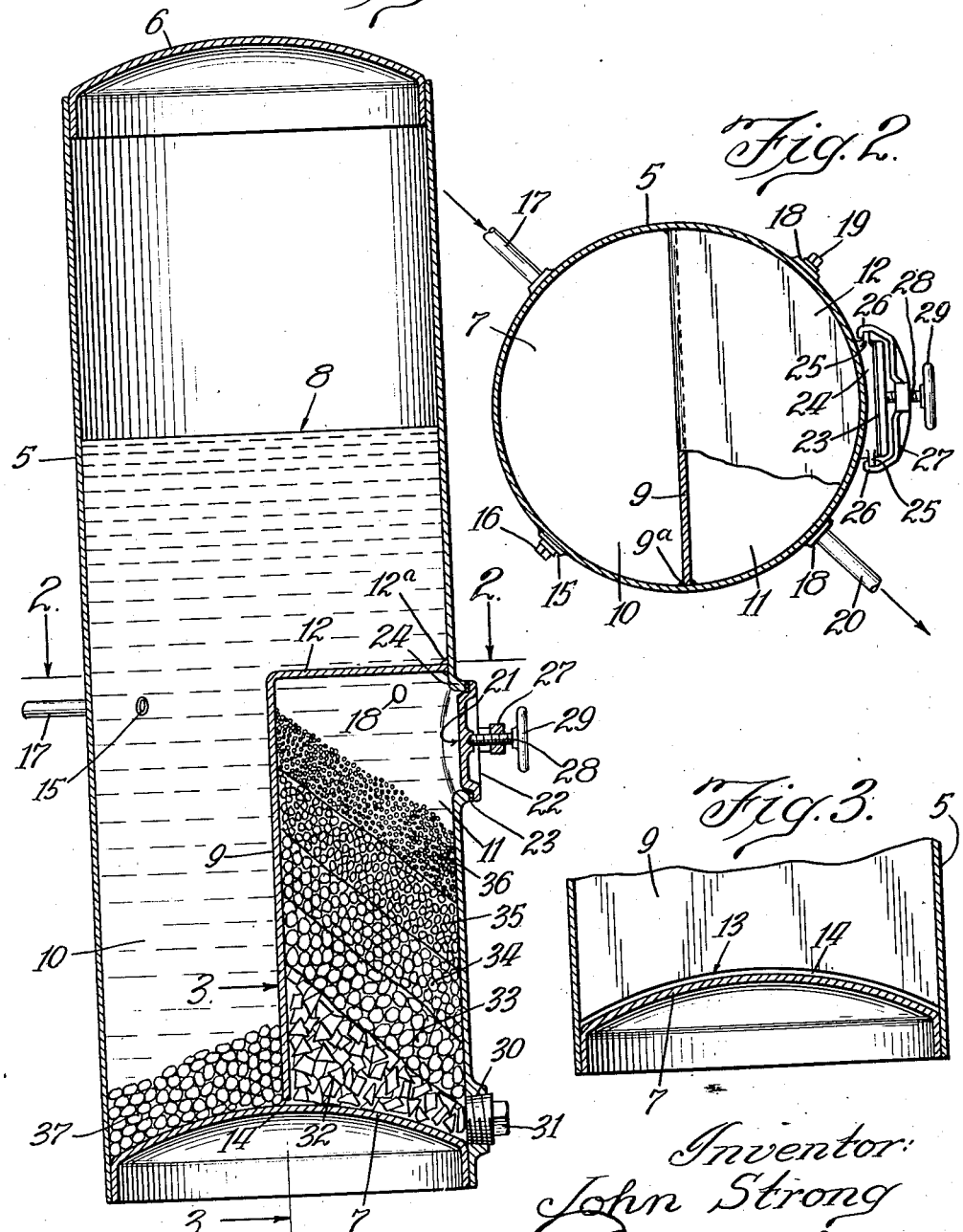
Inventor:
John Strong
By Eugene M. Giles Atty.

Patented Oct. 20, 1942

2,299,415

UNITED STATES PATENT OFFICE 2,299,415

COMBINED FILTER AND PNEUMATIC PRESSURE TANK

John Strong, Downers Grove, Ill.

Application September 5, 1939, Serial No. 293,370

1 Claim. (Cl. 210—136)

This invention relates to pressure tanks such as commonly used in water supply systems to maintain a quantity of water under sufficient pressure to supply same at the various faucets or other outlets from the system and has reference more particularly to the incorporation in such tank of a filter through which the water is supplied from the tank.

The principal objects of my invention are to provide a simple, convenient and efficient filter which may be readily built in as a part of the pressure tank; to permit incorporation of the filter in the pressure tank without any substantial expense or change in the construction of the pressure tank; and to arrange the filter in the tank so that it does not materially affect the capacity of the tank nor the operation thereof—these and other objects being accomplished as pointed out hereinafter and as shown in the accompanying drawing in which, Fig. 1 is a vertical sectional view through a combined pressure tank and filter constructed in accordance with my invention;

Fig. 2 is a transverse sectional view thereof taken on the line 2—2 of Fig. 1 with a portion broken away; and Fig. 3 is a sectional view at the bottom of the tank taken on the line 3—3 of Fig. 1.

Referring to the drawing, the reference numeral 5 indicates a pressure tank, which like tanks commonly used for this purpose is of cylindrical form closed at the top by a domed top wall 6 and at the bottom by an arched bottom 7. Such tanks are usually installed in an upright position and have water supplied thereto to a suitable level, as for example as indicated at 8, to compress air in the upper end of the tank and thereby maintain sufficient pressure on the water in the tank to force same throughout the water distribution system and from the various faucets or outlets thereof.

Automatic means are usually provided to replenish the water in the tank to the normal level, as the supply thereof is depleted for example 8, but such means are not shown as they form no part of the present invention.

Oftentimes it is desirable to filter the water supply and for this purpose I have provided a simple modification of the pressure tank which permits effective filtration of the water supplied therefrom. For this purpose the tank is constructed with a central partition 9 separating the lower portion of the tank into semicylindrical compartments 10 and 11, the latter of which is closed at the top by the top wall 12 whereas the compartment 10 is open to the interior of the tank thereabove. The partition 9 terminates slightly above the bottom wall 7 of the tank and the lower edge thereof is curved as at 13 to correspond to the curvature of the arched bottom wall 7 so as to leave a narrow passageway 14 between the lower edge of the partition 9 and the bottom wall 7 permitting communication from the compartment 10 to the compartment 11, the latter compartment being otherwise closed off from the interior of the pressure tank by the partitions 9 and 12 which are preferably welded to the cylindrical wall of the tank 5 as indicated at 9a and 12a respectively.

One or more water inlets 15 are provided leading into the main chamber of the tank 5 preferably approximately at the upper end of the semicircular compartment space 10, one of which is shown as closed by a plug 16 and the other of which has a pipe 17 leading thereto from a pump (not shown) or other suitable source of water supply, while the compartment 11 has one or more outlets 18 at the top, one of which is also shown as closed by the plug 19 and the other of which has a discharge pipe 20 leading therefrom to the system to which water is supplied from the pressure tank 5.

Filtering material or materials are provided in the compartment 11, for which purpose said compartment has a large opening 21 leading therefrom near the top through the side wall of the tank 5 and normally closed by a removable cover 22 which clamps against a sealing gasket 23 on the raised rim 24 of said opening. For removably holding the cover in place the raised rim 24 of the opening may be provided with flanges 25 detachably engageable by the hooked ends 26 of a bridging 27 which has a screw 28 threaded therethrough and operable by the hand wheel 29 to engage centrally against the cover 22 as shown. For clean out purposes the compartment 11 may also have an opening 30 at the bottom closed by a removable threaded plug 31.

Any desired filtering materials may be employed in the compartment 11, although I have found it most satisfactory to bank a quantity of fairly coarse charcoal across the bottom of the compartment 11 against the opening 14 substantially as shown at 32 in Fig. 1 and apply thereover successive layers of gravel somewhat as indicated at 33, 34, 35 and 36 ranging from a relatively coarse gravel in the bottom layer 33 to a fine gravel in the top layer 36. These filtering materials may be readily applied through the opening 21 which also, together with the plugged opening 30 permits cleaning out of the filter compartment 11 when required.

I also find that it is advantageous to provide a small amount of fairly coarse gravel of about quarter inch size in the bottom of the compartment 10 as indicated at 37, which said gravel may be introduced through one of the inlet holes 15 of the tank before it is installed.

Thus with the above construction the water supply from the pressure tank necessarily is required to pass upwardly through the filtering materials in the compartment 11 to reach the pressure tank and outlet or outlets 18 from the pressure tank and accordingly all of the water supplied therefrom is effectively filtered.

Moreover, it will be observed that this filtering device is provided without substantial change in the ordinary pressure tank, that the partition 9, 12 may be readily installed in the course of construction of the tank, that the addition of the filtering facilities involves only a slight increase in the cost of the tank and involves no extra installation charges and that the tank may be used as an ordinary pressure tank (without filtering materials) if desired.

Furthermore the addition of the filtering facilities does not appreciably affect the capacity of the pressure tank and accordingly does not require a larger size tank than would otherwise be used, and it will also be noted that the filtering materials are safeguarded against disturbance in use as they are continually submerged in water and no air can reach the filter compartment 11 to agitate the contents thereof unless the tank is emptied to the extent that the level of the water in the part 10 of the main chamber of the tank is below the slit 14 through which water enters the filter compartment 11.

While I have shown and described my invention in a preferred form, I am aware that various changes and modifications may be made therein without departing from the principles of my invention, the scope of which is to be determined by the appended claim.

I claim as my invention:

A pressure tank having a water inlet considerably below the normal water level of the tank when in use, and when in use having a large volume of air above the water to be compressed and serve as a pneumatic cushion, a wall within the bottom portion of the tank to substantially shut off communication between the main portion of the tank and a secondary portion thereof, thereby forming an auxiliary compartment, the upper portion of said wall being cut to fit edgewise against the inner surface of the tank wall, and the lateral edges of the lower portion of the first mentioned wall fitting against the vertical inner surface of the tank, said edges being secured in water-tight relation to the tank wall, the bottom edge of the first mentioned wall being spaced from the bottom of the tank to permit flow of water between the bottom of the tank and the bottom edge of said first mentioned wall but being close enough to the tank bottom to prevent movement of sizable materials from one portion of the tank to the other portion thereof, inlet and outlet pipes connected to the tank the inlet being at substantially the height of the upper end of said wall so that the inflowing water will be admitted to the tank below the normal water level and above sediment in the tank, the tank having coarse filtering material in the bottom of both compartments and finer filtering material thereabove in the auxiliary compartment and the outlet communicating with the auxiliary compartment adjacent the top thereof.

JOHN STRONG.